United States Patent [19]

Mott

[11] Patent Number: 5,131,892
[45] Date of Patent: Jul. 21, 1992

[54] CHAIN-BELT

[75] Inventor: Philip J. Mott, Dryden, N.Y.

[73] Assignee: Borg-Warner Automotive Transmission & Engine Components Corporation, Sterling Heights, Mich.

[21] Appl. No.: 657,141

[22] Filed: Feb. 15, 1991

Related U.S. Application Data

[63] Continuation-in-part of Ser. No. 496,461, Mar. 20, 1990, Pat. No. 4,993,999.

[51] Int. Cl.$^5$ .............................................. F16G 1/24
[52] U.S. Cl. ...................................... 474/240; 474/242
[58] Field of Search ......................... 474/237, 240-245

[56] References Cited

U.S. PATENT DOCUMENTS

| | | |
|---|---|---|
| 2,038,583 | 4/1936 | Maurer . |
| 2,475,264 | 7/1949 | Sutton . |
| 3,949,621 | 4/1976 | Beusink . |
| 4,645,479 | 2/1987 | Bateman et al. ................. 474/242 |
| 4,650,444 | 3/1987 | Sakakibara et al. ............ 474/242 X |
| 4,650,445 | 3/1987 | Mott ................................. 474/242 X |
| 4,655,732 | 4/1987 | Takashima ....................... 474/242 X |
| 4,764,158 | 9/1988 | Honda et al. .................... 474/212 |
| 4,993,999 | 2/1991 | Mott ................................. 474/240 |

Primary Examiner—Thuy M. Bui
Attorney, Agent, or Firm—Emch, Schaffer, Schaub

[57] ABSTRACT

An endless power transmission chain-belt (13) is disclosed that is especially adapted for drivingly connecting the pulleys (2, 3) of a pulley transmission (1). The chain-belt (13) has a chain (10, 12) that is an assembly of a plurality of interleaved sets of links (16, 18, 20, 22). A pivot pin (24) extends through the chains (10, 12) to lace and pivotally interconnect adjacent sets of links (16, 18, 20, 22) to provide an endless chain-belt 13). A plurality of first load block (14, 34, 35) are connected to the chain-belt (13) by at least one projection (15) that engages adjacent pivot pins (24). The first load blocks (14, 34, 35) have a substantially flat first bearing surface (21, 41) that is positioned adjacent the links (16, 18, 20, 22). A plurality of second load blocks (14, 34, 35) are connected to the chain-belt (13) by at least one projection (15). The second load blocks (14, 34, 35) have a second bearing surface (21, 41) that is positioned adjacent the links (16, 18, 20, 22) and is disposed at an angle with respect to the first bearing surface (21, 41) of the first load blocks (14, 34, 35).

29 Claims, 6 Drawing Sheets

CHAIN-BELT

This is a continuation-in-part of application Ser. No. 07/496,461, filed Mar. 20, 1990 now U.S. Pat. No. 4,993,999. The above-identified parent application is hereby expressly incorporated by reference in this patent application.

TECHNICAL FIELD

This invention relates to metal chain-belts especially adapted to connect the pulleys of a pulley transmission, particularly a continuously variable transmission (CVT), and broadly comprises a tension member or carrier constructed of a plurality of interlaced links arranged in transverse sets with the adjacent sets joined by pivot means, and load blocks carried by the carrier for engaging the pulleys.

BACKGROUND ART

Flexible power transmission means-comprising an assembly of a plurality of superimposed steel strips and a plurality of V-shaped blocks of metal are known in the art. An example of such construction is disclosed in U.S. Pat. No. 3,720,113 granted Mar. 13, 1973 to H. J. Van Doorne et al. In the patented structure, the blocks are provided with lateral guides having top edges which overlie the steel strips to maintain the parts in assembled relationship. The load is carried by the blocks and the blocks can slide along the band.

Another example of a flexible power transmission means is described in U.S. Pat. No. 3,949,621 granted Apr. 13, 1976 to Beusink, deceased, et al. in which metal plates are mounted on metal strips, the strips being received in slots in one of the lateral edges of the plates.

Other flexible power transmission means comprising an assembly of links, pins and pulley contact members are described in U.S. Pat. Nos. 2,038,583, granted Apr. 28, 1936 to Maurer and 2,475,264, granted July 5, 1949 to Sutton.

Another metal transmission belt is shown in U.S. Pat. No. 4,645,479. In this reference there are a pair of spaced generally parallel chains that are each constructed of a plurality of sets of interleaved links. Each set is joined to the next adjacent set by a pin and the pin extends across both chains. Generally trapezodial load blocks are located between the chains and have cut outs in the sides for locating the chains. The load blocks are generally contoured at their edges to fit into the V of the pulley and are disposed between the chains. The load is carried by the chains and its pins. The load blocks are longitudinally positioned with respect to the chains by the chain pins.

DISCLOSURE OF THE INVENTION

An endless power transmission chain-belt (13) is disclosed that is especially adapted for drivingly connecting the pulleys (2, 3) of a pulley transmission (1). The chain-belt (13) has a chain (10, 12) that is an assembly of a plurality of interleaved sets of links (16, 18, 20, 22). A pivot means (24) extends through the chains (10, 12) to lace and pivotally interconnect adjacent sets of links (16, 18, 20, 22) to provide an endless chain-belt (13). The sets of links (16, 18, 20, 22) of the chain (10, 12) are held together by the pivot means (24). A plurality of first load blocks (14, 34, 35) are connected to the chain-belt (13). The first load blocks (14, 34, 35) have at least one projection (15) that extends in a direction towards the chain (10, 12). The projection (15) engages adjacent pivot means (24) to secure the first load blocks (14, 34, 35) to the chain (10, 12). The first load blocks (14, 34, 35) extend substantially across the width of the chain (10, 12) and have a substantially flat first bearing surface (21, 41) that is positioned adjacent the links (16, 18, 20, 22). Each first load block (14, 34, 35) have lateral edges (26, 28) shaped to frictionally engage the pulleys (2, 3) of the pulley transmission (1). A plurality of second load blocks (14, 34, 35) are connected to the chain-belt (13). The second load blocks (14, 34, 35) have at least one projection (15) that extends in a direction towards the chain (10, 12). The second load blocks (14, 34, 35) have a second bearing surface (21, 41) that is positioned adjacent the links (16, 18, 20, 22). The second bearing surface (21, 41) is disposed at an angle with respect to the first bearing surface (21, 41) of the first load blocks (14, 34, 35). The second load blocks (14, 34, 35) are disposed at an angle with respect to said first load blocks (14, 34, 35) when the first (21, 41) and second (21, 41) bearing surface are in contact with the links (16, 18, 20, 22) and the noise producted by the chain-belt (13) during use is reduced.

BEST MODE FOR CARRYING OUT THE INVENTION

Figures 1, 2:
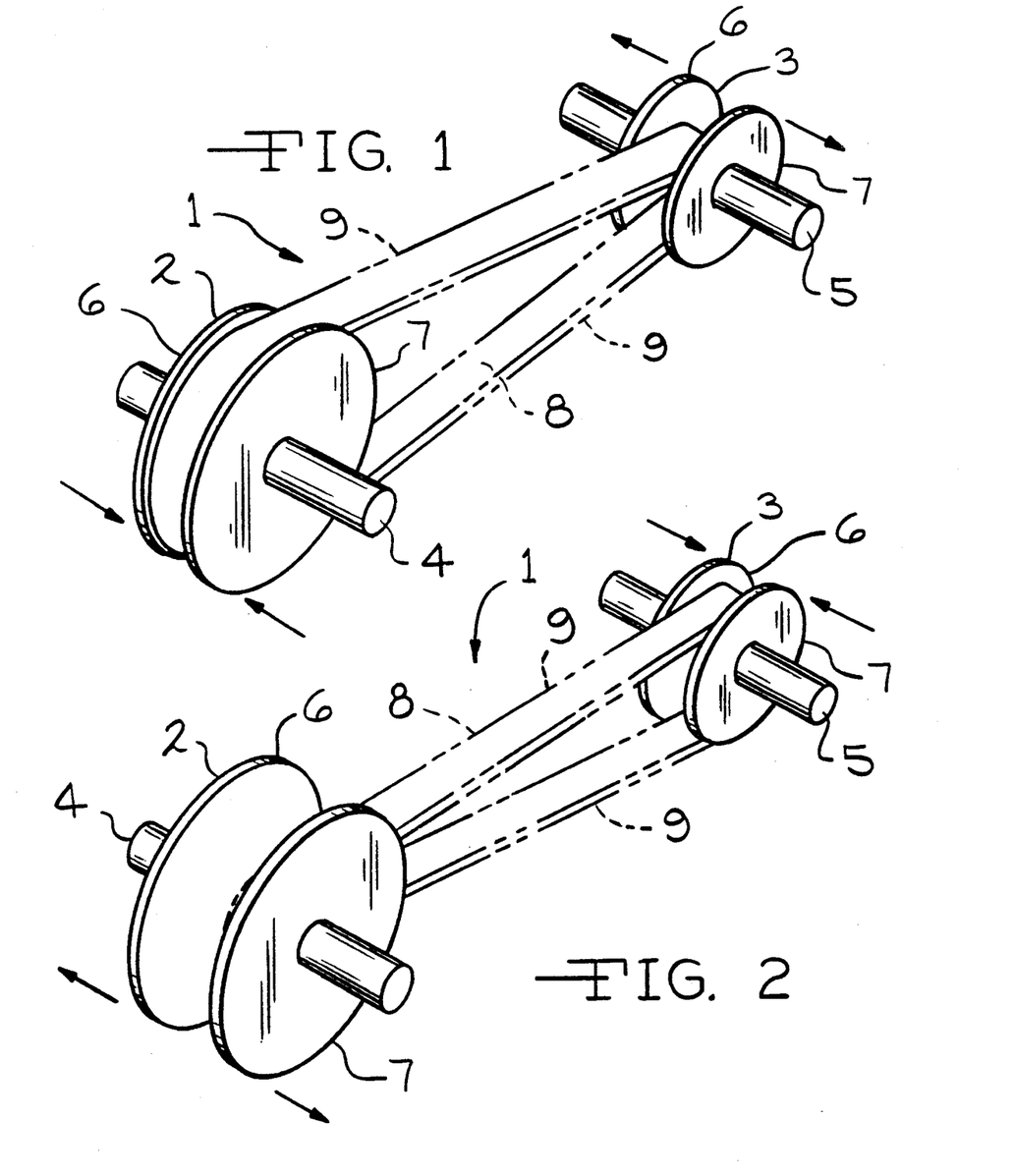
FIG. 1 is a schematic view of a continuously variable transmission (CVT).
FIG. 2 is a schematic view of a continuously variable transmission.

FIGS. 1 and 2 illustrate schematically a continuously variable transmission (CVT) 1 in two drive ratios. The CVT comprises a pair of pulleys 2 and 3 connected respectively to shafts 4 and 5. One of the shafts being the driven shaft and the other shaft being the drive shaft. Pulleys 2 and 3 comprise a pair of flanges 6 and 7 with at least one of the flanges being conical. The pulleys are connected by a belt 8 and the side edges 9 of the belt frictionally engage the pulley flanges. At least one flange of each pulley is axially moveable with respect to the other so as to vary the drive ratios between the pulleys. The arrows indicate the axial movement of the flanges to effect different drive ratios. Means beyond the scope of this invention can be provided for axially moving a least one flange relative to the other.

The power transmission means of this invention as shown in FIGS. 3–8 comprises a pair of spaced chains 10, 12 and a plurality of generally trapezoidal first load blocks 14 and second load blocks 34 that form an endless chain belt 13. Each chain 10 and 12 comprises sets of interleaved links 16, 18 and 20, 22, respectively, which are joined by pins 24. The first load blocks 14 have tapered sides 26, 28 that are disposed to engage the flanges of a pulley. Each first load block 14 is located between the next adjacent pins 24. The first load blocks 14 have a projection 15 that extends from the first load block into the space 16 between the spaced chains 10, 12. The projection 15 engages the pins 24 that join the interleaved links together. The projection has grooves 17 positioned on opposite sides of the projection. The grooves 17 are disposed for receiving the pins 24 and the grooves have a shape that does not restrict rotational movement of the first load blocks 14 relative to the pins. The center point for the grooves 17 are positioned at substantially the same point on opposed surfaces of the projection 15. The grooves allow the spaced chains 10, 12 to articulate around the pins 24 during use of the chain. The end of the projection 15 that is spaced apart from bottom of the first load block terminates in a flange 19 that extends at least partially over adjacent pins 24. The positioning of the pins 24 in grooves 17 of the projection 15 and flange 19 act to secure the first load block to the spaced chains 10, 12. The surface of the first load blocks 14 from which the projection 15 extends, has a substantially flat first bearing surface 21. The first bearing surface 21 is positioned to be in contact with one side of the links that form spaced chains 10, 12. The links 16, 18, 20, 22 have a substantially flat surface 31 against which the first bearing surface is positioned. The frst bearing surface 21 of the first load blocks 14 is usually disposed to be substantially perpendicular to the side 11 of the projection 15. The side 11 of the projection 15 is substantially parallel to the outer edge 25 of the spaced chains 10, 12. Thus, the first bearing surface 21 is substantially parallel to the edge 25 of the spaced chains 10, 12. The first bearing surface 21 is also substantially perpendicular to a plane 27 that extends through the first load block 14 in a direction transverse to the direction of travel of said spaced chains 10, 12. The plane 27 extends along the first load blocks 14 that is spaced apart from the spaced chains 10, 12 can be contoured to remove metal from portions of the load block where the metal is not needed for strength purposes to reduce the weight of the load block. Thus the load blocks 14 are longitudinally positioned by the pins 24, and the load is carried by the pins and the chains. The load blocks 14 may be described as being generally T-shaped.

Figure 5:
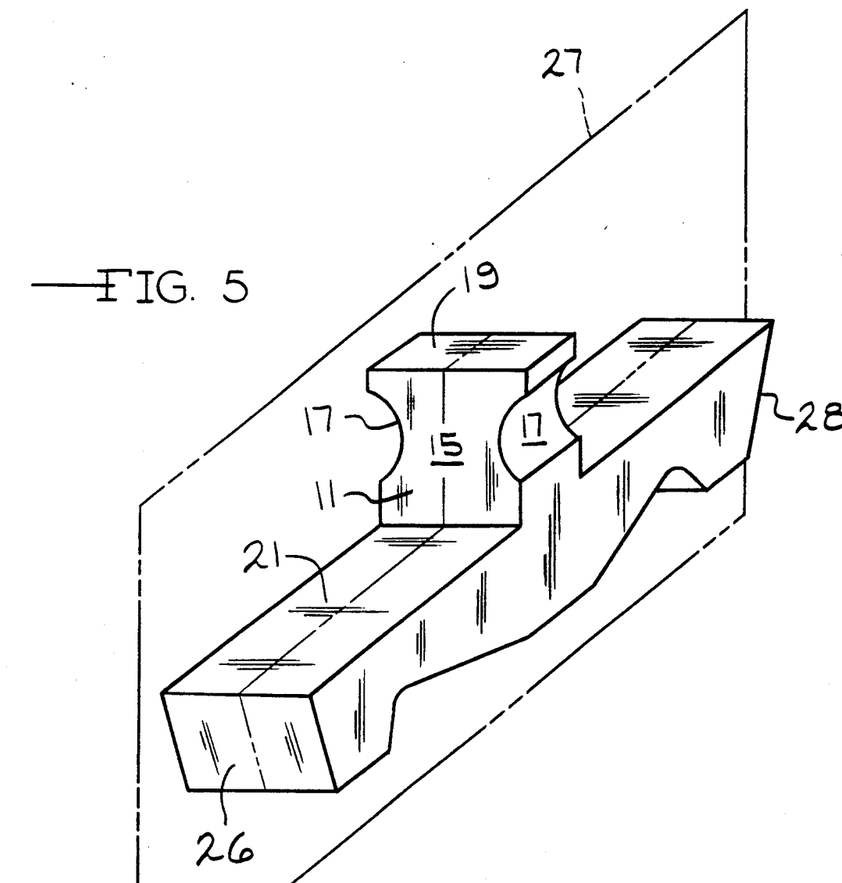
FIG. 5 is a perspective view of a load block of the invention.
Figure 6:
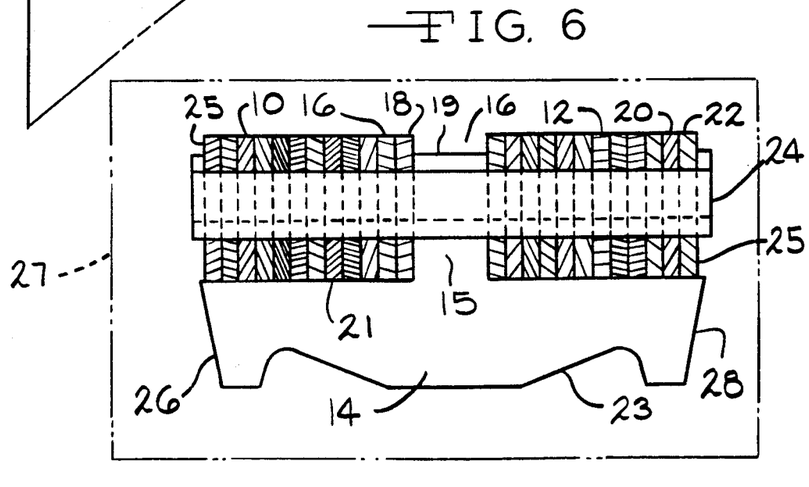
FIG. 6 is a cross-sectional view taken along line 6—6 of FIG. 3.

The tapered sides 26, 28 of each load block 14 may be roughened to enhance the frictional contact with the flanges 6, 7, respectively of a pulley. In actual use, the assembly connects spaced pulleys to provide a drive therebetween, the pulleys may be of a variable nature so that the drive ratio therebetween is variable, as is known in the art.

Figures 7, 8:
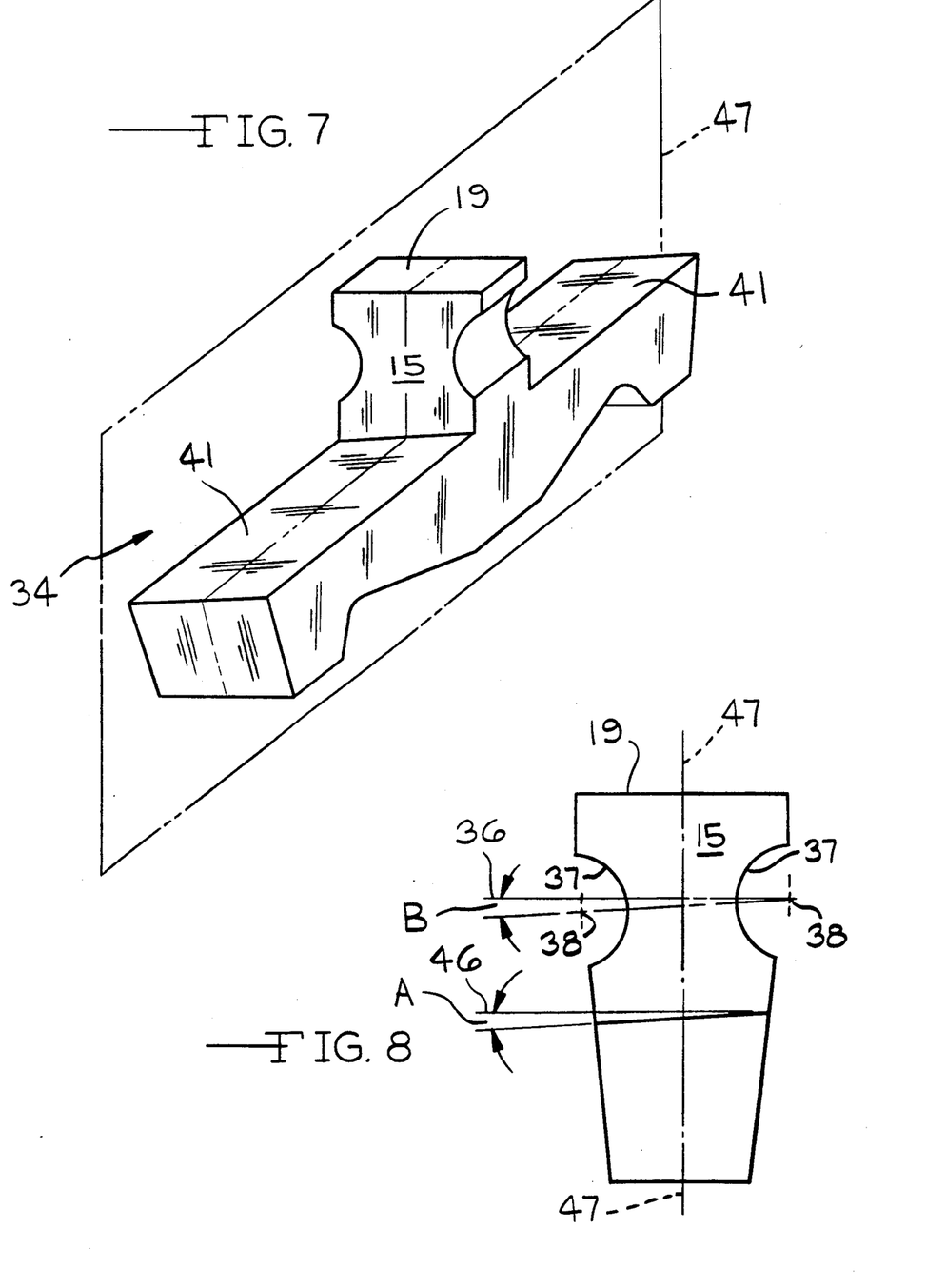
FIG. 7 is a perspective view of another load block of the invention.
FIG. 8 is a side elevation view of the load block of FIG. 7.
Figure 9:
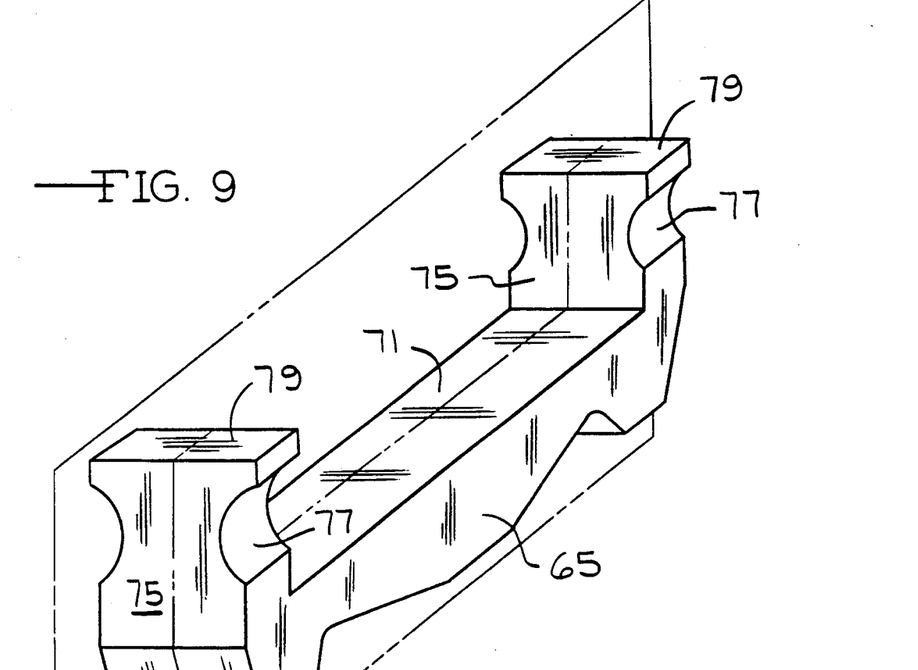
FIG. 9 is a perspective view of another embodiment of a chain-belt of the present invention.
Figure 10:
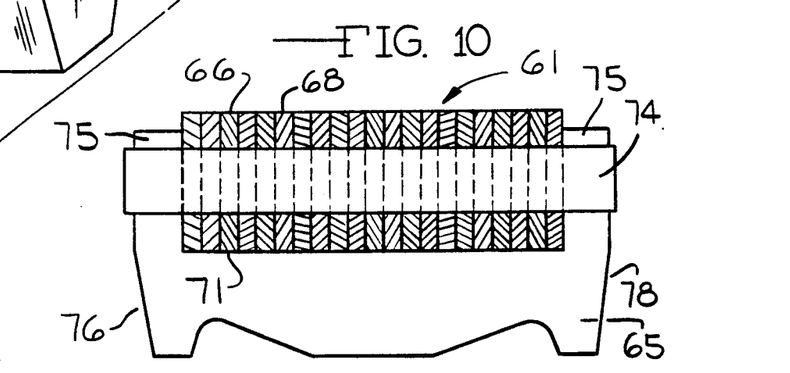
FIG. 10 is a cross-sectional view of a chain-belt utilizing the load block of FIG. 9.
Figure 11:
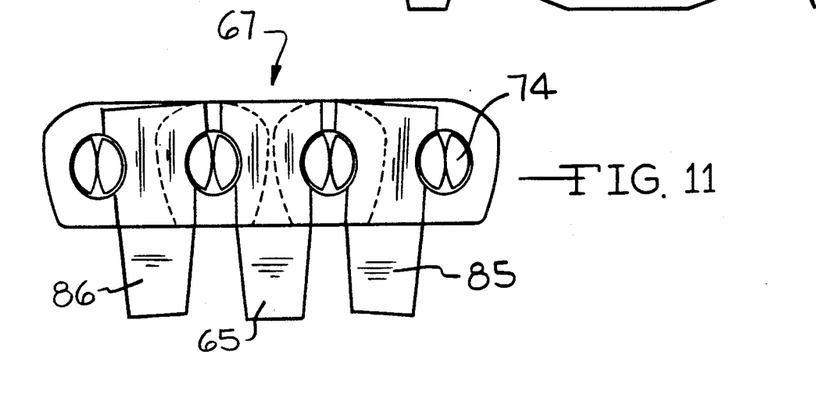
FIG. 11 is a side elevation view of the chain-belt of FIG. 10.

FIGS. 7 and 8 show the second load blocks 34 that are utilized in the chain-belt. The second load blocks 34 are constructed substantially the same as the first load blocks 14. Items of the second load blocks that are the same as the first block block the reference numerals used on the first load block will be repeated for those elements. Further, for the sake of brevity, we will not redescribe the similar features as these features have already been described with respect to the first load blocks 14. However, we will describe the differences that are present between the second load blocks 34 and the first load blocks 14. The second load blocks 34 have a second bearing surface 41 that is disposed at an angle with respect to the first bearing surface 21 of the first load blocks 14. The second bearing surface 41 is also disposed to engage the surface 31 formed by the links 16, 18, 20, 22. The second bearing surface 41 on the second load blocks 34 is also disposed at an angle A with respect to a line 46 that extends perpendicularly to a plane 47 that extends through the second load block in a direction transverse to the direction of travel for the spaced chains 10, 12 where the plane 47 extends along the transverse centerline of the second load block 34. The angle A is substantially the same as the angle between the first bearing surface 21 and the second bearing surface 41. In practice it has been found to be particularly desirable to ahve the second bearing surface 41 disposed at an angle from about 1° to about 10° with respect to the first bearing surface 21. The second load blocks 34 have grooves 37 positioned on opposite sides of the projection 15. The grooves 37 are disposed for receiving the pins 24 and the grooves have a shape that does not restrict rotational movement of the second load blocks 34 relative to the pins. The grooves 37 allow the chains 10, 12 to articulate around the pins 24 during use of the chain. The center points 38 for the grooves 37 on the second load blocks 34 are also disposed at an angle B with respect to a line 236 that is substantially parallel to line 46. Angle B is substantially the same as angle A for the second bearing surface 41. The position for the center points 38 for the grooves 37 results in one of the arcuate grooves 37 being positioned further from the flange 19 that is positioned on the top of the projection 15 on the second load block 34. The arcuate groove 37 are disposed at substantially the same angle as the second baring surface 41 on the second load blocks 34. The angle B for the arcuate grooves 37 on the second load blocks 34 allow the second bearing surfaces 41 to be positioned adjacent and in contact with the surface of the links 16, 18, 20 and 22 of the spaced chains 10, 12.

Figure 3:
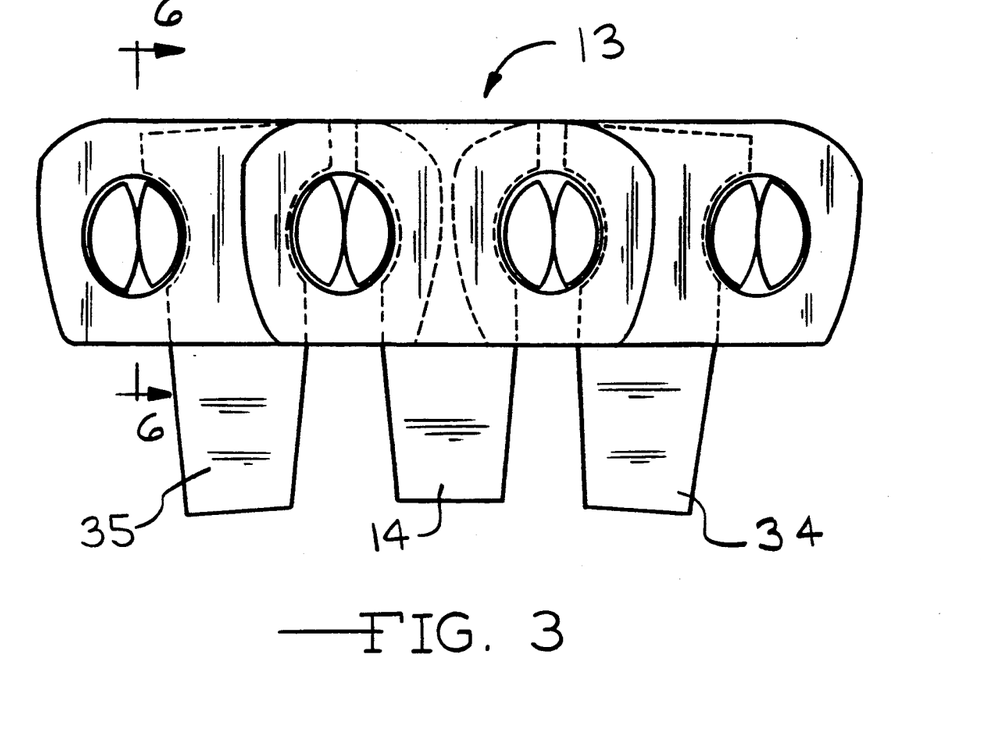
FIG. 3 is a side elevation view of the invention.
Figure 4:
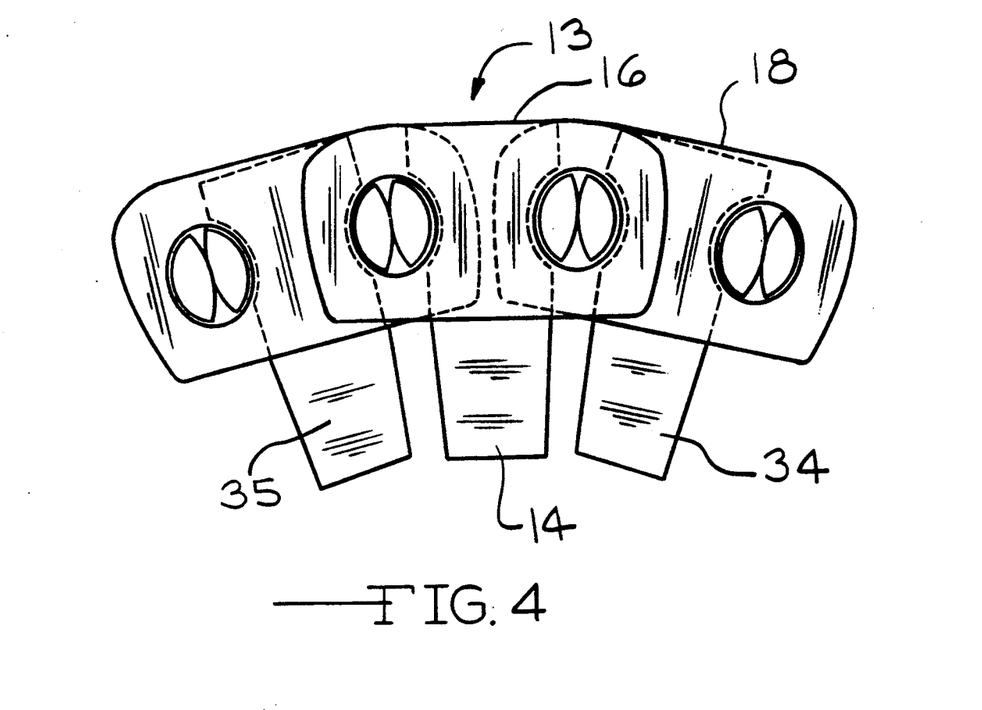
FIG. 4 is a side elevation view.

The second laod blocks 34 are normally positioned randomly in the chain-belt 13 of this invention. The second load blocks are disposed at an angle with respect to the first load blocks and engage the flanges 6 and 7 of the pulleys 2 and 3 in a different manner than the first load blocks 14. The random positioning of the second load blocks 34 breaks the pattern of noise that is produced when the chain-belt 13 engages the flanges of a pulley and significantly reduces the noise generated by the chain-belt 13. It has been found that random positioning is most effective in reducing the noise generated by the chain-belt during use.

The pulley contacting sides of the first load blocks 14 and second load blocks 34 are positioned on opposite sides of the spaced chains 10, 12 and this allows the combined chains 10, 12 to be substantially as wide as the first and second load blocks. This allows as many links as possible to be used to form the spaced chains 10, 12 which improves the tensile strength of the chains. The projection 15 is also relatively thin so that not many links are lost in the space required for the projection. In practice it has been found that approximately 40% more links can be used in the chain of the present invention when compared to prior art CVT chains with load blocks.

The solid monolithic load blocks are also very strong and very effective in handling the forces encountered in contacting the flanges 6 and 7 of the pulley. In operation the first load blocks 14 and the second load blocks 34 are forced against the spaced chains 10, 12 so that first bearing surface 21 and second bearing surface 41 are in contact against the links of the chains. This spreads the forces on the chain-belt 13 over the bearing surfaces of the first and second load blocks and also over the links of the spaced chains 10, 12. This reduces the load that must be carried by the projection 15 on the load blocks and the pins 24 that secure together the links of the spaced chains 10, 12. This allows the projection to be relatively small in size as the basic role of the projection is to hold the first and second load blocks in position adjacent the spaced chains 10, 12 and to assist in removing the first and second load blocks from the pulleys. Accordingly, the spaced chains 10, 12 can be as large as possible to increase the tensile strength of the chains.

The first load blocks 14 and second load blocks 34 may be constructed of steel or other suitable material and the chain links are generally stamped from sheet metal ribbon stock and the pins are generally die formed metal stock. The opposite ends of the pins can be upset to retain the assembly of links, or in a preferred embodiment, the outside links of the chains are press-fit on the pins during the assembly of the links and load blocks while the inner links are slip-fit on the pins.

The second load blocks 34 can also be rotated 180° when they are positioned on the chain-belt 13. The rotated second load blocks are given the reference numeral 35 in FIG. 3. The rotated second load blocks 35 are the same as the second load blocks 34 except that the load block has been rotated 180° with respect to the chain-belt. This rotation places the second bearing surface 41 on the rotated second load blocks 35 at an angle with respect to the first load bearing surface 21 of the first load blocks 14 and the second load bearing surface 41 of the second load blocks 34. Although FIG. 3 shows first load blocks 14, second load blocks 34 and rotated second load blocks 35 being used on the chain-belt 13 it should be understood that only second load blocks 34 and rotated second load blocks 35 can be utilized. The second load blocks 34 and rotated second load blocks 35 are normally randomly positioned in the chain-belt 13 and engage the flanges 6 and 7 of the pulleys 2, 3 at different positions to reduce the noise generated by the chain-belt during use.

FIGS. 9-13 show another construction of the present invention that utilizes a single chain 61 and a plurality of generally trapezodial first load blocks 65 and second load blocks 85 to form an endless chain-belt 67. The chain 61 is formed of sets of interleaved links 66, 68 respectively, which are pivotally joined together by pins 74. The first load blocks 65 have tapered sides 76, 78 that are disposed to engage the flanges of a pulley. Each load block is located between adjacent pins 74 on the chain-belt 67. The first load blocks 65 have a substantially flat first bearing surface 71 that is disposed in substantially the same manner and for the same purpose as the first bearing surface 21 utilized with the first load blocks 14 previously described for chain-belt 14. A projection 75 extends from each end of the first load blocks 65 and extends between the adjacent pins 74. The projections 75 engage the pins 74 that join the interleaved links together. The projections 75 have grooves 77 that are positioned on opposite sides of the projections. The grooves 77 are disposed for receiving the pins 74 and the grooves have a shape that does not restrict rotational movement of the first load blocks 65 relative to the pins. The grooves 77 allow the chain 61 to articulate around the pins 74 during use of the chain. The ends of the projections 75 that are spaced from the bottom of the first load blocks terminate in a flange 79 that extends at least partially over the adjacent pins 74. The positioning of the pins 74 in the grooves 77 of the projections 75 and the flanges 79 act to secure the first load blocks 65 to the chain 61.

Figures 12, 13:
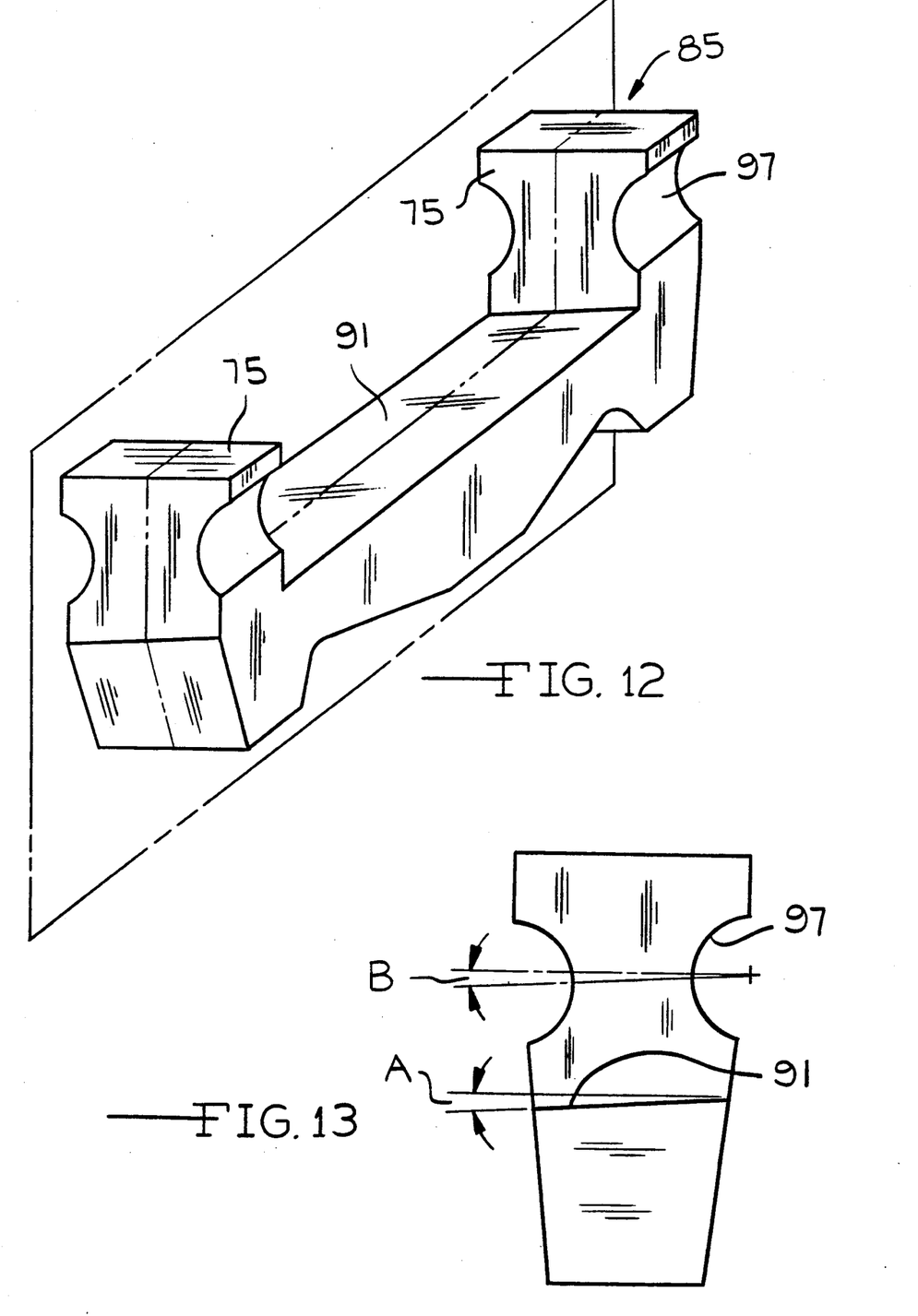
FIG. 12 is a perspective view of another load block used in the chain-belt of FIG. 9.
FIG. 13 is a cross-sectional view taken along line 13—13 of the load block of FIG. 12.

The second load blocks 85 are substantially the same as the first load blocks 65. However, the second load blocks 85 have a second bearing surface 91 and grooves 97 that are disposed in substantially the same manner and for the same purpose as the second bearing surface 41 and grooves 37 of the second load blocks 34 as previously described for chain-belt 14. The second bearing surface 91 and grooves 97 are disposed at substantially the same angle with respect to the first bearing surface 71 as previously described for the second bearing surface 41 and grooves 37 of the second load blocks 34 of the chain-belt 14. The second load blocks 85 are also randomly positioned in the chain-belt 67. Thus, the first load blocks 65 and second load blocks 85 are essentially the same in structure and function as the previously discussed first load blocks 14 and second load blocks 34. The only significant difference is that the projections 75 for the present load blocks are located on each end of the load blocks instead of in the center of the load blocks.

The second load blocks 85 can be rotated 180° when they are positioned on the chain-belt 67. The rotated second load blocks 86 are the same as the second load blocks 85 except that the load block has been rotated 180°. This rotation is done for the same purpose and in the same manner as previously described for second load blocks 34. The second load blocks 85 and rotated second load blocks 86 can also be used exclusively in the chain-belt 67 as previously described and these load blocks would be randomly positioned on the chain-belt 67.

The chain-belt 67 of this embodiment functions in the same basic manner as the previously described chain-belt 13. One advantage of this embodiment is that the projections 75 are located on the outside edge of the chain 61 and the projections can act to retain the links 66, 68 in their position in the chain 61. This allows guide links or other devices that are normally used to hold the chain together to be eliminated.

In practice it has been found that the construction utilized for the chain-belt of this invention can reduce the noise produced by the chain-belt during use from about 40% to about 70% over similar prior art chain-belts.

The above description is given for the sake of explanation. Various modifications and substitutions, other than those cited, can be made without departing from the scope of the following claims.

I claim:

1. An endless power transmission chain-belt (13) especially adapted for drivingly connecting the pulleys (2, 3) of a pulley transmission (1) comprising:
   a chain (10, 12), said chain (10, 12) being an assembly of a plurality of interleaved sets of links (16, 18, 20, 22);
   a pivot means (24) extending through said chains (10, 12) to lace and pivotally interconnect adjacent sets of links (16, 18, 20, 22) to provide an endless chain-belt (13), said sets of links (16, 18, 20, 22) of said chain (10, 12) being held together by said pivot means (24);

a plurality of first load block (14, 34, 35) connected to said chain-belt (13), said first load blocks (14, 34, 35) having at least one projection (15) that extends in a direction towards chain (10, 12), said projection (15) engaging adjacent pivot means (24) to secure said first load blocks (14, 34, 35) to said chain (10, 12), said first load blocks (14, 34, 35) extending substantially across the width of said chain (10, 12), said first load blocks (14, 34, 35) having a first bearing surface (21, 41) that is positioned adjacent said links (16, 18, 20, 22), each first load block (14, 34, 35) having lateral edges (26, 28) shaped to frictionally engage said pulleys (2, 3) of said pulley transmission (1); and a plurality of second load blocks (14, 34, 35) connected to said chain-belt (13), said second load blocks (14, 34, 35) having at least one projection (15) that extends in a direction towards said chain (10, 12), said projection (15) engaging adjacent pivot means (24) to secure said second load blocks (14, 34, 35) to said chain (10, 12), said second load blocks (14, 34, 35) having a second bearing surface (21, 41) that is positioned adjacent said sets of links (16, 18, 20, 22), said second bearing surface (21, 41) being disposed at an angle with respect to said first bearing surface (21, 41) of said first load blocks (14, 34, 35) whereby said second load blocks (14, 34, 35) are disposed at an angle with respect to said first load blocks (14, 34, 35) when said first (21, 41) and second (21, 41) bearing surface are in contact with said links (16, 18, 20, 22) and each second load block (14, 34, 35) having lateral edges (26, 28) shaped to frictionally engage said pulleys (2, 3) of said transmission (1).

2. The chain-belt (13) of claim 2, wherein said projection (15) on said first load blocks (14, 34, 35) and projection (15) on said second load blocks (14, 34, 35) have substantially arcuate grooves (17, 37) for engaging said adjacent pivot means (24).

3. The chain-belt (13) of claim 2, wherein said projections (15) terminates in a flange (19) that extends over the adjacent pivot means (24).

4. The chain-belt (13) of claim 3, wherein said first load blocks (14, 34, 35) and said second load blocks (14, 34, 35) are a one piece construction.

5. The chain-belt (13) of claim 2, wherein first bearing surface (21, 41) of said load blocks (14, 34, 35) and said second bearing surface (21, 41) of said second load blocks (14, 34, 35) are a substantially flat surface that is positioned adjacent said sets of links (16, 18, 20, 22) to spread the load on said load blocks (14, 34, 35) over the width of said chain (10, 12).

6. The chain-belt (13) of claim 5, wherein said links (16, 18, 20, 22) have a substantially flat surface (31) positioned in contact with said first (21, 41) and second (21, 41) bearing surfaces.

7. The chain-belt (13) of claim 1, wherein said first bearing surface (21) is disposed substantaily perpendicular to a plane that extends through said first load block (14) in a direction transverse to said direction of travel for said chain (10, 12) where said plane extends along the transverse centerline for said first load block (14).

8. The chain-belt (13) of claim 7, wherein said second bearing surface (41) is disposed at an angle from about 1° to about 10° with respect to said first bearing surface (21) and with respect to a line that extends perpendicular to a plane that extends through said second load block (34, 35) in a direction transverse to said direction of travel for said chains (10, 12) where said plane extends along the transverse centerline for said second load block (34, 35).

9. The chain-belt (13) of claim 8, wherein said articulate grooves (37) on said second load blocks (34, 35) are disposed at an angle where one of said arcuate grooves (37) is positioned further from said flange (19) of said projection (15) on said second load block to allow said second bearing surface (41) to be in contact with said links (16, 18, 20, 22).

10. The chain-belt (13) of claim 9, wherein said arcuate grooves (37) on said second load blocks (34, 35) are disposed at substantially the same angle as said second bearing surface (41).

11. The chain-belt (13) of claim 1, wherein said chain is comprised of a first (10) and a second (12) chain and said first and second chains (10, 12) are disposed in substantially parallel spaced apart relationship.

12. The chain-belt (13) of claim 11, wherein said projection (15) on said first blocks (14, 34, 35) and said projection on said second load blocks (14, 34, 35) extends between said first and second chains (10, 12).

13. The chain-belt (67) of claim 1, wherein a projection (75) is located on each end of said first load blocks (65, 85, 86) and a projection (75) is located on each end of said second load blocks (65, 85, 86) said projection (75) engaging said adjacent pivot means (74) to secure said first (65, 85, 86) and second (65, 85, 86) load blocks to said chain (61).

14. The chain-belt (13) of claim 1, wherein said first load blocks (14, 34, 35) and said second load blocks (14, 34, 35) are randomly positioned in said chain-belt (13).

15. The chain-belt (13) of claim 1, wherein said first bearing surface (41) is disposed at an angle from about 1° to about 10° with respect to a line that extends perpendicular to a plane that extends through said first load block (34) in a direction transverse to said direction of travel for said chain (10, 12) where said plane extends along the transverse centerline for said first load block (34).

16. The chain-belt (13) of claim 15 wherein said second load block (35) is a first load block (34) that has been rotated 180° on said chain (10, 12) so that said second bearing surface (41) is disposed at an angle with respect to said first bearing surface (41).

17. An endless power transmission chain-belt (13) especially adapted for drivingly connecting the pulleys (2, 3) of a pulley transmission (1) comprising:

a chain (10, 12), said chain (10, 12) being an assembly of a plurality of interleaved sets of links (16, 18, 20, 22), said plurality of links (16, 18, 20, 22) defining a flat surface (31) along one side of said claim (10, 12);

a pivot means (24) extending through said chains (10, 12) to lace and pivotally interconnect adjacent sets of links (16, 18, 20, 22) to provide an endless chain-belt (13), said sets of links (16, 18, 20, 22) of said chain (10, 12) being held together by said pivot means (24);

a plurality of first load blocks (14, 34, 35) connected to said chain-belt (13), said first load blocks (14, 34, 35) having at least one projection (15) that extends in a direction towards chain (10, 12), said projection (15) defining substantially arcuate grooves (17, 37) on opposite sides of said projection (15), said grooves (17, 37) being disposed to engage adjacent pivot means (24) to secure said first load blocks (14, 34, 35) to said chain (10, 12), said first load blocks (14, 34, 35) extending substantially across the width of said chain (10, 12), said first load blocks (14, 34, 35) having a substantially flat first bearing surface (21, 41) that is positioned adjacent said flat surface (31) of said links (16, 18, 20, 22), each first load block (14, 34, 35) having lateral edges (26, 28) shaped to frictionally engage said pulleys (2, 3) of said pulley transmission (1); and a pluralilty of second load blocks (14, 34, 35) connected to said chain-belt (13), said second load blocks (14, 34, 35) having at least one projection (15) that extends in a direction towards said chain (10, 12), said projection (15) defining substantially arcuate grooves (17, 37) on opposite sides of said projection (15), said grooves (17m, 37) being disposed to engage adjacent pivot means (24) to secure said second load blocks (14, 34, 35) to said chain (10, 12), said second load blocks (14, 34, 35) having a substantially flat second bearing surface (21, 41) that is positioned adjacent said sets of links (16, 18, 20, 22), said second bearing surface (21, 41) being disposed at an angle with respect to said first bearing surface (21, 41) of said first load blocks (14, 34, 35) whereby said second load blocks (14, 34, 35) are disposed at an angle with respect to said first load blocks (14, 34, 35) when said first (21, 41) and second (21, 41) bearing surface are in contact with said flat surface (31) of said links (16, 18, 20, 22) and each second load blocks (14, 34, 35) having lateral edges (26, 28) shaped to frictionally engage said pulleys (2, 3) of said transmission (1).

18. The chain-belt (13) of claim 17, wherein said projections (15) terminate in a flange (19) that extends over the adjacent pivot means (24).

19. The chain-belt (13) of claim 17, wherein said first load blocks (14, 34, 35) and said second load blocks (14, 34, 35) are a one piece construction.

20. The chain-belt (13) of claim 17, wherein said first bearing surface (21) is disposed substantially perpendicular to a plane that extends through said first load blocks (14) in a direction transverse to said direction of travel for said chains (10, 12) where said plane extends along the transverse centerline for said first load blocks (14).

21. The chain-belt (13) of claim 20, wherein said second bearing surface (41) is disposed at an angle form about 1° to about 10° with respect to said first bearing surface (21) and with respect to a line that extends perpendicular to a plane that extends through said second load blocks (34) in a direction transverse to said direction of travel for said chains (10, 12) where said plane extends along the transverse centerline for said second load blocks (34).

22. The chain-belt (13) of claim 20, wherein said articulate grooves (37) on said second load blocks (34) ar disposed at an angle where one of said arcuate grooves (37) is position further from said flange (19) of said projection (15) on said second load block (34) to allow said second bearing surface (41) to be in contact with said flat surface 31 of said links (16, 18, 20, 22), 23. The chain-belt (13) of claim 22, wherein said arcuate grooves (37) on said second load blocks (34) are disposed at substantially the same angle as said second bearing surface (41).

24. The chain-belt (13) of claim 17, wherein said chain is comprised of a first (10) and second (12) chain and said first (10) and second (12) chain are disposed in substantially parallel spaced apart relationship.

25. The chain-belt (13) of claim 24, wherein said projection (15) on said first load blocks (14, 34, 35) and said projection (15) on said second load blocks (14, 34, 35) extends between said first and second chains (10, 12).

26. The chain-belt (67) of claim 17, wherein a projection (75) is located on each end of said first load blocks (65, 85, 86) and a projection (75) is located on each end of said second load blocks (65, 85, 86) said projections (75) engaging said adjacent pivot means (74) to secure said first load blocks (65, 85, 86) and second load blocks (65, 85, 86) to said chain (61).

27. The chain-belt (13) of claim 17, wherein said first load blocks (14, 34, 35) said second load blocks (14, 34, 35) are randomly positioned in said chain-belt (13).

28. The chain-belt (13) of clailm 17, wherein said first bearing surface (41) is disposed at an angle from about 1° to about 10° with respect to a line that extends perpendicular to a plane that extends through said first load block (34) in a direction transverse to said direciton of travel for said chain (10, 12) where said plane extends along transverse centerline for said first load block (34).

29. The chain-belt (13) of claim 28 wherein said second load block (35) is a first load block (34) that has been rotated 180° on said chain (10, 12) so that said second bearing surface (41) is disposed at an angle with respect to said first bearing surface (41).

* * * * *